United States Patent
Derrick et al.

(10) Patent No.: US 6,385,719 B1
(45) Date of Patent: May 7, 2002

(54) METHOD AND APPARATUS FOR SYNCHRONIZING PARALLEL PIPELINES IN A SUPERSCALAR MICROPROCESSOR

(75) Inventors: John Edward Derrick, Round Rock; Brian R. Konigsburg, Austin; Lee Evan Eisen, Austin; David Stephen Levitan, Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/345,719

(22) Filed: Jun. 30, 1999

(51) Int. Cl.[7] .............................. G06F 9/38; G06F 9/312
(52) U.S. Cl. ...................... 712/235; 712/239; 712/237; 712/240; 712/215; 712/206; 712/23; 711/125; 711/135
(58) Field of Search .......................... 712/239, 9, 233, 712/238, 24, 23, 206, 200, 209, 240, 215, 237, 217, 235, 256, 207, 236; 711/118, 125, 144, 128, 135, 133, 134

(56) References Cited

U.S. PATENT DOCUMENTS 5,142,634 A * 8/1992 Fite et al. .................... 712/240
5,649,225 A * 7/1997 White et al. .................... 712/23
5,764,946 A * 6/1998 Trane et al. ................. 712/239

* cited by examiner

Primary Examiner—Daniel H. Pan
(74) Attorney, Agent, or Firm—Anthony V. S. England; Bracewell & Patterson, L.L.P.

(57) ABSTRACT

A transfer tag is generated by the Instruction Fetch Unit and passed to the decode unit in the instruction pipeline with each group of instructions fetched during a branch prediction by a fetcher. Individual instructions within the fetched group for the branch pipeline are assigned a concatenated version (group tag concatenated with instruction lane) of the transfer tag which is used to match on requests to flush any newer instructions. All potential instruction or Internal Operation latches in the decode pipeline must perform a match and if a match is encountered, all valid bits associated with newer instructions or internal operations upstream from the match are cleared. The transfer tag representing the next instruction to be processed in the branch pipeline is passed to the Instruction Dispatch Unit. The Instruction Dispatch Unit queries the branch pipeline to compare its transfer tag with transfer tags of instructions in the branch pipeline. If the transfer tag matches a branch instruction tag the Instruction Decode Unit is stalled until the branch instruction is processed thus, providing a synchronizing method for the parallel pipelines.

14 Claims, 4 Drawing Sheets

METHOD AND APPARATUS FOR SYNCHRONIZING PARALLEL PIPELINES IN A SUPERSCALAR MICROPROCESSOR

BACKGROUND OF THE INVENTION

1. Technical Field

The present invention relates in general to data processing systems and in particular to a processor in a data processing system. More particularly, the present invention relates to synchronizing parallel pipelines in a superscalar processor.

2. Description of the Related Art

Reduced instruction set computer ("RISC") processors are employed in many data processing systems and are generally characterized by high throughput of instructions. RISC processors usually operate at a high clock frequency and because of the minimal instruction set do so very efficiently. In addition to high clock speed, processor efficiency is improved even more by the inclusion of multiple execution units allowing the execution of two, and sometimes more, instructions per clock cycle.

Processors with the ability to execute multiple instructions per clock cycle are described as "superscalar." Superscalar processors, such as the PowerPC™ family of processors available from IBM Corporation of Armonk, N.Y., provide simultaneous dispatch of multiple instructions. Included in the processor are an Instruction Cache ("IC"), an Instruction Dispatch Unit ("DU"), at least one Execution Unit ("EU") and a Completion Unit ("CU"). Generally, a superscalar, RISC processor is "pipelined," meaning that a second instruction group is waiting to enter the execution unit(s) as soon as the previous instruction group is finished.

In a superscalar processor, instruction processing is usually accomplished in six stages—fetch, decode, dispatch, execute, writeback and completion. The fetch stage is primarily responsible for fetching instructions utilizing the Instruction Fetch Unit (IFU) from the instruction cache and determining the address of the next instruction to be fetched. The decode stage generally handles all time-critical instruction decoding for instructions in the instruction buffer. The dispatch stage (utilizing DU) is responsible for non-time-critical decoding of instructions supplied by the decode stage and for determining which of the instructions can be dispatched in the current cycle.

The execute stage executes the instruction selected in the dispatch stage, which may come from the reservation stations or from instructions arriving from dispatch. The write back stage is used to write back any information from the rename buffers that is not written back by the completion stage. The completion stage maintains the correct architectural machine state by considering instructions residing in the completion buffer and utilizes information about the status of instructions provided by the execute stage.

Pipelined superscalar processors provide for out-of-order execution of instructions but utilize in-order fetch and completion to maintain sequential consistency of the instruction stream. Pipelining allows high operating frequencies at the cost of start-up latencies. To minimize pipeline latencies, the processor predicts the next pipeline state. When the processor is correct, no additional latencies are introduced. When a prediction is wrong, the pipeline must be restored to the correct state. Generally, instruction queues in the pipeline help absorb latencies by supplying queued data during upstream flush and re-fetch events.

In complex superscalar processors utilizing multiple pipelines it is critical that the pipelines be synchronized with each other. For example, if there are two pipelines operating and working in parallel, i.e., a normal instruction pipeline and a separate pipeline for branch state instructions, the instruction pipeline must not get ahead of the branch pipeline or a branch could execute before its state is available. The branch pipeline can detect and flush/invalidate conditions in the instruction pipeline.

Instructions provided from an Instruction Fetch Unit to an Instruction Decode Unit (IDU) can be invalidated quite late in the decode section of the instruction pipeline. This may occur when more branches are fetched than can be processed per clock cycle. If the fetch predictor is determined to be in error, all later instructions in the instruction pipeline must be cleared. No internal operations (IOPs) may pass from the decode section of the instruction pipeline to the dispatch unit before it is determined that the branch state will be available before the branch executes. A branch predictor utilizes additional information (history, address, etc.) about an instruction to improve the probability of a correct prediction and the fetch predictor simply uses the next sequential instruction without information on the instructions to be retrieved. The delay associated with determining whether the fetch prediction matches the branch prediction or that the fetch prediction is wrong and the decode pipeline must be flushed, slows up instruction processing and becomes a bottleneck that is undesirable in a complex processor.

It would be desirable therefore, to provide a method of synchronizing parallel pipelines, in addition to supplying queued data, to assure that branch executions are accomplished with correct information.

SUMMARY OF THE INVENTION

It is therefore one object of the present invention to provide a method and apparatus that will prevent premature execution of Internal Operations in parallel pipelines.

It is another object of the present invention to provide a method and apparatus for invalidating Internal Operations and individual instructions in parallel pipelines after a mis-predicted fetch operation.

It is a further object of the present invention to provide a method and apparatus for reducing instruction validation steps.

The foregoing objects are achieved as is now described. A transfer tag is generated by the Instruction Fetch Unit and passed to the decode unit in the instruction pipeline with each group of instructions fetched during a branch prediction by a fetcher. Individual instructions within the fetched group for the branch pipeline are assigned a concatenated version (group tag concatenated with instruction lane) of the transfer tag which is used to match on requests to flush any newer instructions. All potential instruction or Internal Operation latches in the decode pipeline must perform a match and if a match is encountered, all valid bits associated with newer instructions or internal operations upstream from the match are cleared. The transfer tag representing the next instruction to be processed in the branch pipeline is passed to the Instruction Dispatch Unit. The Instruction Dispatch Unit queries the branch pipeline to compare its transfer tag with transfer tags of instructions in the branch pipeline. If the transfer tag matches a branch instruction tag the Instruction Decode Unit is stalled until the branch instruction is processed thus, providing a synchronizing method for the parallel pipelines.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
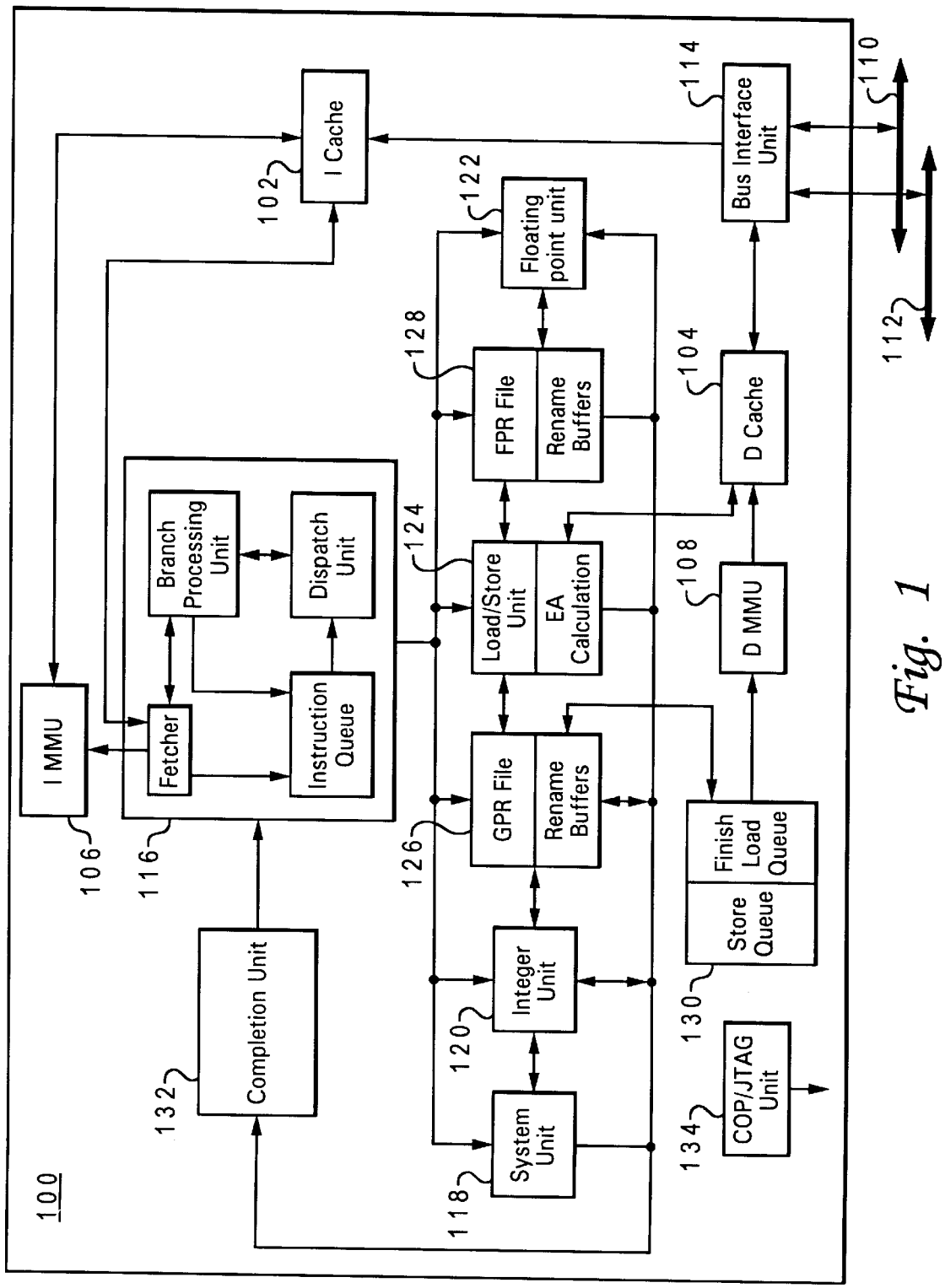
FIG. 1 depicts a block diagram of a processor and related portions of a data processing system in which a preferred embodiment of the present invention may be implemented.

With reference now to the figures, and in particular with reference to FIG. 1, a block diagram of a processor and related portions of a data processing system in which a preferred embodiment of the present invention may be implemented are depicted. Processor 100 is a single integrated circuit superscalar processor, such as the PowerPC™ processor available from IBM Corporation of Armonk, N.Y. Accordingly, processor 100 includes various units, registers, buffers, memories, and other sections, all of which are formed by integrated circuitry. Processor 100 also operates according to reduced instruction set computing ("RISC") techniques.

Processor 100 includes level one (L1) instruction and data caches ("I Cache" and "D Cache") 102 and 104, respectively, each having an associated memory management unit ("I MMU" and "D MMU") 106 and 108. As shown in FIG. 1, processor 100 is connected to system address bus 112 and to system data bus 110 via bus interface unit 114. Instructions are retrieved from system memory (not shown) to processor 100 through bus interface unit 114 and are stored in instruction cache 102, while data retrieved through bus interface unit 114 is stored in data cache 104. Instructions are fetched as needed from instruction cache 102 by instruction unit 116, which includes instruction fetch logic, instruction branch prediction logic, an instruction queue and dispatch unit.

The dispatch unit within instruction unit 116 dispatches instructions as appropriate to execution units such as system unit 118, integer unit 120, floating point unit 122, or load/store unit 124. System unit 118 executes condition register logical, special register transfer, and other system instructions. Integer or "fixed-point" unit 120 performs add, subtract, multiply, divide, shift or rotate operations on integers, retrieving operands from and storing results in integer or general purpose registers ("GPR File") 126. Floating point unit 122 performs single precision and/or double precision multiply/add operations, retrieving operands from and storing results in floating point registers ("FPR File") 128.

Load/store unit 124 loads instruction operands from data cache 104 into integer registers 126 or floating point registers 128 as needed, and stores instructions results when available from integer or floating point registers 126 or 128 into data cache 104. Load and store queues (not shown) are utilized for these transfers from data cache 104 to and from integer or floating point registers 126 or 128. Completion unit 132, which includes reorder buffers, operates in conjunction with instruction unit 116 to support out-of-order instruction processing, and also operates in connection with rename buffers within integer and floating point registers 126 and 128 to avoid conflict for a specific register for instruction results. Common on-chip processor (COP) and joint test action group (JTAG) unit 134 provides a serial interface to the system for performing boundary scan interconnect tests.

The architecture depicted in FIG. 1 is provided solely for the purpose of illustrating and explaining the present invention, and is not meant to imply any architectural limitations. Those skilled in the art will recognize that many variations are possible. Processor 100 may include, for example, multiple integer and floating point execution units to increase processing throughput. All such variations are within the spirit and scope of the present invention.

Figure 2:
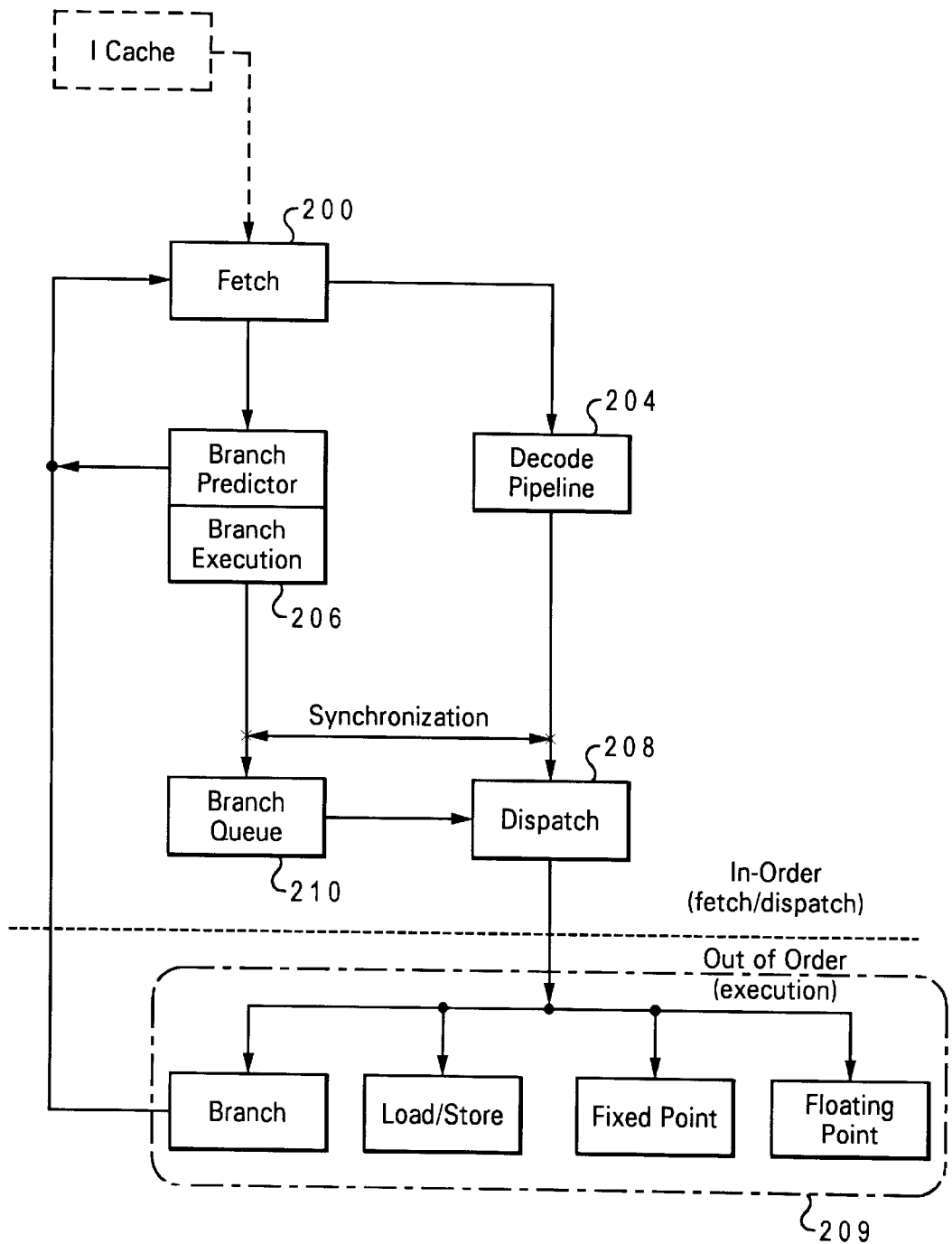
FIG. 2 is a high-level block diagram of a branch instruction execution in accordance with a preferred embodiment of the present invention.

Referring to FIG. 2, a high-level block diagram of a branch instruction execution in accordance with a preferred embodiment of the present invention is illustrated. Fetcher 200 is the interface to I-Cache, a prefetch buffer (not shown) and an L2 Cache (not shown). It presents a single stream of instructions to both decode pipeline 204 and branch pipeline 206. Fetcher 200 and branch pipeline 206 are part of the same unit. Fetcher 200 determines (by predicting) all the subsequent instructions to fetch. The prediction is always the next sequential address and not more than one instruction group. Fetched instructions are always an aligned eight instruction group (32 bytes) and fetcher 200 assigns a four bit tag to the fetched instruction group. The instruction group is sent to branch pipeline 206 and decode pipeline 204 at the same time where both pipelines operate independently. Both pipelines have their own flow control and can hold or release instructions independently of the other.

Branch pipeline 206 receives fetched instructions and makes more accurate predictions than fetcher 200 on instructions to fetch after a branch instruction. If branch pipeline 206 agrees with fetcher 200 prediction, no action or changes are required. On the other hand if fetcher 200 predicts and delivers a mis-predicted instruction, the instruction must be purged by branch pipeline 206 and decode pipeline 204.

Branch pipeline 206, after purging the erroneous instruction provides a new predicted fetch address to fetcher 200. Branch pipeline 206 may process up to two branches from a single fetch group. Decode pipeline 206 has an input queue that can hold at least four fetch groups. The queue is partitioned such that partial groups of four or less instructions can occupy one of the eight 16 byte entries. The queue is capable of feeding a four stage pipeline to the dispatch point. Decode pipeline 204 is limited to processing one branch per cycle.

Branch pipeline 206 and decode pipeline 204 see fetch groups at the same time. Both process the instructions independently except for the mechanism described in FIG. 3. Decode pipeline 204 deals with all instructions, not just branches. Information required for execution of an instruction is passed along through decode pipeline 204 to dispatch 208. Dispatch 208 is the last point of "in order" processing and the execution of individual instructions will take place "out of order" as depicted, through various execution units 209. For branch instructions, some information is passed through branch pipeline 206 and held until passing to branch queue 210. Therefore, the path through branch pipeline 206 and the path through dispatch 208 must be synchronized, as indicated, or the branch instruction may execute with incorrect information.

Since the branch pipeline and decode pipeline operate independently and rely on different processor resources to make forward progress, the decode pipeline could get ahead of the branch pipeline in terms of processing a particular branch instruction. The branch pipeline is responsible for generating the state required for branch execution and to prevent a branch from executing without its required state, the two pipelines must interlock. To this end, the branch pipeline uses the branch hold interface. If the tagged instruction indicated by the branch hold interface is the next instruction to dispatch, the decode pipeline will stall to prevent a branch from executing before its state is available. The branch pipeline then sources either the tag of the next branch to process, or a previous non-dispatched instruction if the next branch is not yet determined, to determine the state of the decode pipeline.

Figure 3:
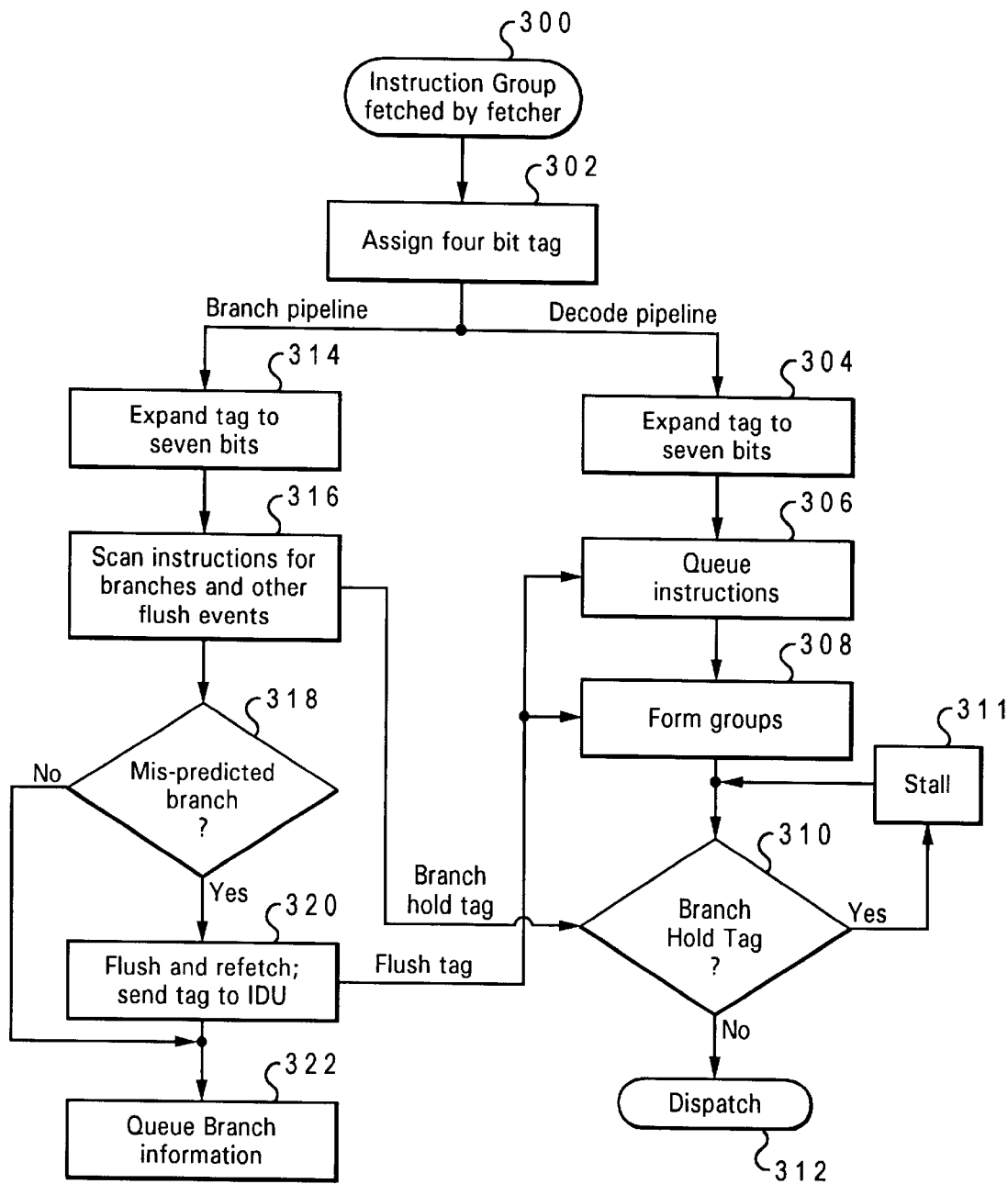
FIG. 3 depicts a high-level flow diagram of a method for synchronizing pipelines in accordance with a preferred embodiment of the present invention.

Referring now to FIG. 3, a high-level flow diagram of a method for synchronizing pipelines in accordance with a preferred embodiment of the present invention, is depicted. The pipelines are parallel and operate independently with each pipelines own flow control. The fetch groups are sent to both pipelines simultaneously. The process begins with step 300, which depicts the fetcher retrieving a group of instructions which. The process proceeds to step 302, which illustrates the fetcher assigning a transfer tag (hereinafter referred to as tag) to each fetch group. The tag is "J" bits, where J=log2(N), where N is the number of pipeline stages that can be flushed.

The process proceeds to step 304 and 314, which depicts individual instructions being sent to each pipeline simultaneously, (transfers are M instructions wide) and being assigned a "K" bit instruction tag (K=log2(M)) along with the J-bit transfer tag. The J+K bit tag value is used to match on requests to flush all newer instructions which may be generated by the Instruction Fetch Unit. All potential instruction, or IOP, latches in a decode pipeline must perform a match on this J+K bit tag. If a match is encountered all valid bits associated with newer instructions or IOPs (upstream from the match) are cleared. The original four bit tag field is extended by three bits indicating an instruction lane within the fetch group (see FIG. 4) for a given tagged instruction. The associated tags are used for comparisons and are such that no two fetch groups can have the same tag and be in a pipeline stage that could be flushed, thus defining the minimum number of tags required. From step 304, the process passes to step 306, which depicts the decode pipeline associating the assigned tag with each instruction received and queuing the tagged instructions.

The process next passes to step 308 which illustrates the decode pipeline forming instruction groups, including the associated tags. The branch pipeline manages the tags concurrently with the decode pipeline. The process then proceeds to step 310, which depicts a determination of whether the branch pipeline has processed the instruction by sending a branch hold tag to the decode pipeline. If the determination is made that the instruction has been processed, the process returns to step continues to step 312, which illustrates sending the instruction to the dispatch unit. If the determination is made that a flush and refetch event has not been processed, by receipt of a branch hold tag, the process passes to step 311, which illustrates stalling the pipeline. The process then passes back to step 310 and repeats the determination of whether there is a matching branch hold tag present.

Returning to step 302, as indicated above, the instruction group receives a four bit tag, identifying the group, and later, each instruction within the group receives a concatenated tag (the group tag is concatenated with an instruction lane) identifying each instruction within the group. The process proceeds to step 316, which illustrates the fetcher scanning each the instruction group for branches and other flush events, such as I Cache misses. More than two branch instructions in an instruction group can cause a flush as no more than two branches may be processed in a pipeline stage. The process proceeds concurrently to step 318 and step 310, which illustrates a branch hold tag sent to the decode pipeline if any of the preceding events are detected.

Flush events must identify an instruction. Based on the type of flush, the identified instruction may or may not be flushed. There is a fixed timing relationship between the delivery of instructions to the decode pipeline and branch pipeline and any flush and refetch event. This limits how many fetch groups may be flushable at one time. So, the process proceeds to step 318, which illustrates a determination of whether a mis-predicted branch is included in the group of instructions. If there is no mis-predicted branch, the process then passes to step 322, which depicts sending the information on to the branch queue. The branch queue sends a branch hold tag to all stages in the decode pipeline to notify the decode pipeline of the status of the branch pipeline.

Returning to step 318, if the determination is made that there is a mis-predicted branch, the process passes instead to step 320, which illustrates a flush tag sent to the Instruction Decode Unit and all stages of the decode pipeline. A flush operation is then initiated in the decode pipeline.

The tagged fetch groups are scanned by the fetcher for mis-predicted branches, I Cache misses, groups with more than two branches, etc., and signals the decode pipeline the status of each fetch group. The decode pipeline receives the tag of the target group and compares that tag to the tags in the decode pipeline. If there are no matching tags present, then the instructions present are sent to dispatch unit and dispatched. If there is a matching tag present, the decode pipeline is stalled (branch hold tag) or the appropriate instructions are flushed (flush tag). The flush tag tells the IDU what to flush and includes all instructions that are younger but may or may not include the matching instruction. This method prevents an instruction from being dispatched and having to send flush operations to multiple locations. Instructions are compared in a decode queue (not shown) located at the beginning of the decode unit (not shown). In this four stage pipeline, a flush may be achieved up to and including the second stage of the pipeline. A branch hold can be accomplished up to and including the third stage of the pipeline where the compare is done.

Figure 4:
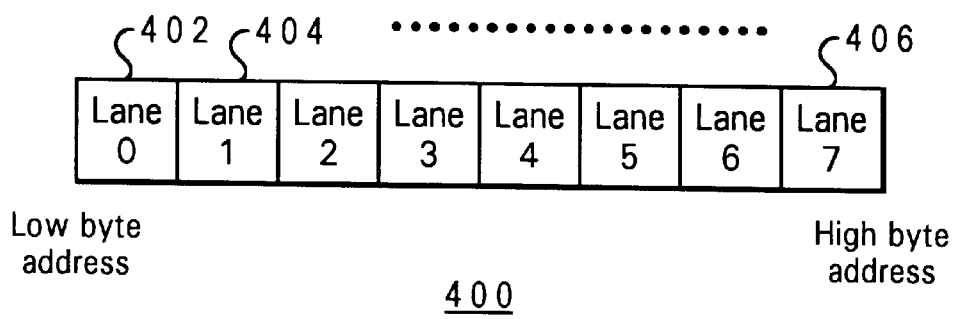
FIG. 4 is a high-level block diagram of a fetch group interface in accordance with a preferred embodiment of the present invention.

Referring to FIG. 4, a high-level block diagram of a fetch group interface in accordance with a preferred embodiment of the present invention, is illustrated. Each block shown represents a "lane" capable of carrying an instruction, generally of word length. Eight instructions are always sent to the branch pipeline or decode pipeline in parallel via physical connections; lane 0 402, lane 1 404, etc. The decode pipeline can process one branch per clock cycle and the branch pipeline can process two branches per cycle.

Lanes are part of the pipeline and are physical entities each of which carry instructions, usually of word length, one after the other. For example, in a system that utilizes a word length of 32 bits, lane 0 402 would be carrying a particular set of 32 bits representing a word and lane 1 404 would carry a different set of 32 bits. Latch bits on each instruction indicate which lane an instruction is in and the designated lane indicates the age of the instruction. Lane 0 402 would carry the earliest instruction in the group and lane 7 406 would carry the latest instruction in the group. Older instructions will always be in the lower numbered lane due to instruction order presented to the queue prior to transmittal to the pipelines.

Instructions from the fetcher are always aligned on 32 byte boundaries and the instructions always come across on lane 7 406. Each lane has an associated valid bit so if the program logic branches into the middle of one of the fetch groups, the valid bit indicates which instructions are executable and which should be ignored. The three bit tag referred to in FIG. 3 stays the same regardless of the validity of the instruction.

This construction greatly simplifies hardware by forcing instructions to be aligned as they are sent through the pipelines. The instructions are aligned and because the lane automatically indicates the age of the instruction there is no requirement to compare each instruction to determine the sequence.

It is important to note that those skilled in the art will appreciate that the mechanism of the present invention and/or aspects thereof are capable of being distributed in the form of a computer usable medium of instructions in a variety of forms, and that the present invention applies equally regardless of the particular type of signal bearing media used to actually carry out the distribution. Examples of computer usable media include: nonvolatile, hard-coded type media such as read only memories (ROMs) or erasable,. electrically programmable read only memories (EEPROMs), recordable type media such as floppy disks, hard disk drives and CD-ROMs, and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method for synchronizing pipelines in a pipelined processor, comprising the steps of:
   fetching a group of instructions;
   simultaneously sending said group of instructions through a first and second pipeline;
   generating a first tag to associate with said group of instructions;
   generating at least one second tag to associate with individual instructions within said group of instructions, wherein generating said at least one second tag includes concatenating said first tag to identify said individual instructions within said group of instructions;
   scanning said group of instructions for mis-predictions, flush events or both;
   comparing tags, associated with individual instructions in said second pipeline, to said first and second tags;
   sending a flush tag to said second pipeline or
   sending a branch hold tag to said second pipeline; and
   flushing said individual instructions according to instructions in said flush tag or stalling said second pipeline by sending a hold signal to said second pipeline.

2. The method of claim 1, wherein generating said first tag associated with said group of instructions, further comprises:
   sending said first tag to said second pipeline.

3. The method of claim 1, wherein said fetched group of instructions does not begin in the entry lane, further comprises:
   fetching a complete group of instructions if said group of instructions begins on a 32 byte boundary; and
   fetching a partial group of instructions if said group of instructions does not begin on a 32 byte boundary.

4. The method of claim 1, wherein comparing tags associated with individual instructions in said second pipeline to said first and second tags, further comprises:
   flushing said instructions with matching first and second tags if a flush tag is present before a third stage of said second pipeline; and
   stalling said pipeline if said instructions have matching first and second tags and a branch hold tag is present in said third stage of said second pipeline.

5. An apparatus for synchronizing pipelines in a pipelined processor, comprising the steps of:
   fetch means for fetching a group of instructions;
   means for simultaneously sending said group of instructions through a first and second pipeline;
   means for generating a first tag to associate with said group of instructions;
   means for generating at least one second tag to associate with individual instructions within said group of instructions;
   scan means for scanning said group of instructions for mis-predictions, flush events or both;
   logic means for comparing tags, associated with individual instructions in said second pipeline, to said first and second tags;
   transmitting means for sending a flush tag to said second pipeline or
   transmitting means for sending a branch hold tag to said second pipeline; and
   flush means for flushing said individual instructions according to instructions in said flush tag or stalling said second pipeline by sending a hold signal to said second pipeline.

6. The apparatus of claim 5, wherein generating said first tag associated with said group of instructions, further comprises:
   transmission means for sending said first tag to said second pipeline.

7. The apparatus of claim 5, wherein generating said second tag to associate with individual instructions within said group of instructions, further comprises:
   logic means for concatenating said first tag to identify said individual instructions within said group of instructions.

8. The apparatus of claim 5, wherein said fetched group of instructions does not begin in the entry lane, further comprises:
   fetch means for fetching a complete group of instructions if said group of instructions begins on a 32 byte boundary; and
   fetch means for fetching a partial group of instructions if said group of instructions does not begin on a 32 byte boundary.

9. The apparatus of claim 5, wherein means for comparing tags associated with individual instructions in said second pipeline to said first and second tags, further comprises:
   flush means for flushing said instructions with matching first and second tags if a flush tag is present before a third stage of said second pipeline; and stall means for stalling said pipeline if said instructions have matching first and second tags and a branch hold tag is present in said third stage of said second pipeline.

10. A computer program product having instructions within a computer readable medium for synchronizing pipelines in a pipelined processor, comprising:

instructions within said computer readable medium for fetching a group of instructions;

instructions within said computer readable medium for simultaneously sending said group of instructions through a first and second pipeline;

instructions within said computer readable medium for generating a first tag to associate with said group of instructions;

instructions within said computer readable medium for generating at least one second tag to associate with individual instructions within said group of instructions;

instructions within said computer readable medium for for scanning said group of instructions for mis-predictions, flush events or both;

instructions within said computer readable medium for comparing tags, associated with individual instructions in said second pipeline, to said first and second tags;

instructions within said computer readable medium for sending a flush tag to said second pipeline or instructions within said computer readable medium for sending a branch hold tag to said second pipeline; and instructions within said computer readable medium for flushing said individual instructions according to instructions in said flush tag or stalling said second pipeline by sending a hold signal to said second pipeline.

11. The method of claim 1, wherein generating said first tag associated with said group of instructions, further comprises:

instructions within said computer readable medium for sending said first tag to said second pipeline.

12. The computer program product of claim 10, wherein generating said second tag to associate with individual instructions within said group of instructions, further comprises:

instructions within said computer readable medium for concatenating said first tag to identify said individual instructions within said group of instructions.

13. The computer program product of claim 10, wherein said fetched group of instructions does not begin in the entry lane, further comprises:

instructions within said computer readable medium for fetching a complete group of instructions if said group of instructions begins on a 32 byte boundary; and instructions within said computer readable medium for fetching a partial group of instructions if said group of instructions does not begin on a 32 byte boundary.

14. The computer program product of claim 10, wherein comparing tags associated with individual instructions in said second pipeline to said first and second tags, further comprises:

instructions within said computer readable medium for flushing said instructions with matching first and second tags if a flush tag is present before a third stage of said second pipeline; and instructions within said computer readable medium for stalling said pipeline if said instructions have matching first and second tags and a branch hold tag is present in said third stage of said second pipeline.

\* \* \* \* \*